US012752445B2

(12) United States Patent
Bergeron et al.

(10) Patent No.: US 12,752,445 B2
(45) Date of Patent: Oct. 6, 2026

(54) KNIFE WITH A SHEARING ARM

(71) Applicant: AMERICAN OUTDOOR BRANDS, Columbia, MO (US)

(72) Inventors: Russell Robert Bergeron, Columbia, MO (US); Mark Timothy Dalton, Columbia, MO (US); Dennis W. Cauley, Fayette, MO (US); Tim Kinney, Warrenton, MO (US); Derek Wright, Columbia, MO (US); Brett Eckelkamp, Fulton, MO (US); Matthew Charles Kinamore, Columbia, MO (US); James Tayon, Moberly, MO (US)

( * ) Notice: Subject to any disclaimer, the term of this patent is extended or adjusted under 35 U.S.C. 154(b) by 107 days.

(21) Appl. No.: 18/817,615

(22) Filed: Aug. 28, 2024

(65) Prior Publication Data

US 2026/0061641 A1 Mar. 5, 2026

(51) Int. Cl.
*B26B 11/00* (2006.01)
*B26B 1/02* (2006.01)

(52) U.S. Cl.
CPC .............. *B26B 11/005* (2013.01); *B26B 1/02* (2013.01)

(58) Field of Classification Search
CPC .................................................... B26B 11/005
See application file for complete search history.

(56) References Cited

U.S. PATENT DOCUMENTS

| | | | | | |
|---|---|---|---|---|---|
| 1,012,555 | A * | 12/1911 | Irick | B26B 11/00 | 451/415 |
| 4,095,337 | A * | 6/1978 | Pharr | B26B 1/00 | 30/158 |
| 6,651,344 | B2 * | 11/2003 | Cheng | B26B 1/044 | 30/159 |
| 2006/0230620 | A1 * | 10/2006 | Steigerwalt | B26B 1/046 | 30/159 |
| 2007/0067999 | A1 * | 3/2007 | Arrowsmith | B26B 1/042 | 30/157 |
| 2007/0271795 | A1 * | 11/2007 | Brandon | B26B 29/02 | 30/152 |
| 2008/0110029 | A1 * | 5/2008 | Ryan | F41C 27/20 | 30/155 |
| 2026/0061641 | A1 * | 3/2026 | Bergeron | B26B 11/005 | |

* cited by examiner

*Primary Examiner* — Hwei-Siu C Payer
(74) *Attorney, Agent, or Firm* — Holland & Hart LLP

(57) ABSTRACT

Methods, systems, and devices for a knife with a shearing arm are described. In some instances, a knife may include at least one integrated shearing arm. For example, a knife may include a retractable blade that may be used to perform certain types of tasks such as cutting rope, cutting bate, killing a catch, and the like. Further, the knife may include a cutting shear having a retractable arm for performing different types of operations, such as cutting fishing line. The cutting shear may be integrated into the handle of the knife such that the knife's liner includes a blade (e.g., a first blade of a shear) and the arm includes a second blade (e.g., a second blade of the shear). The arm may be spring loaded or otherwise configured to rotate toward and away from the body of the knife in a shearing motion.

18 Claims, 7 Drawing Sheets

KNIFE WITH A SHEARING ARM

TECHNICAL FIELD

The following relates to cutting apparatuses, including a knife with a shearing arm.

BACKGROUND

Different cutting apparatuses, such as knives, scissors, multipurpose tools, and the like, are sometimes used in various sporting applications. For example, knives are often popular for their utility in a substantial number of different applications. A knife often includes a single blade carried by a common frame. Other tools, such as multi-tools, may include different combinations of tools (depending on its intended application) designed for a more universal or generic application. Such tools can include pliers, a wire cutter, a bit driver, one or more knife blades, a saw blade, a bottle opener, or the like. Other tools may be designed to service more specific applications or niche markets and correspondingly include tools that are useful for the intended application. For example, certain tools may be specifically designed for automobile repairs, hunting, fishing or other outdoor applications, gardening and the like, whereas knives often have more generic use and applicability.

DETAILED DESCRIPTION

In some applications, such as fishing, an individual may need to utilize multiple tools to perform various tasks. For example, a fisherman may carry a knife to perform tasks such as cutting rope, cutting bate, cleaning or killing their catch, and the like. Additionally, a fisherman may also carry shears (e.g., cutting shears, scissors) to cut fishing line in the event of a line change, a line break, a knot trim, or other similar events. Because a fisherman may also carry a variety of other types of tools and gear—such as hooks, lines, lures, rods, reels, floats, sinkers, nets, and the like—carrying multiple tools that serve similar purposes may be cumbersome and a challenge to use while near water. Moreover, a fisherman may need to quickly switch between tasks that require different tools. For example, a fisherman may need to cut rope (e.g., using a knife) and cut a line (e.g., using shears) within a relatively short duration. Accordingly, it may be both cumbersome and time consuming to carry multiple tools. Thus, a single tool that is able to perform multiple tasks and be easy to operate may be desirable.

A knife with a shearing arm is described herein. For example, the knife described herein may include a retractable blade that may be used to perform certain types of tasks such as cutting rope, cutting bate, cleaning or killing a catch, and the like. Further, the knife may include at least one cutting shear having a retractable arm for performing different types of operations, such as cutting fishing line. The cutting shear may be integrated into the handle of the knife such that the knife's liner includes a blade (e.g., a first blade of a shear) and the shearing arm includes a second blade (e.g., a second blade of the shear). The arm may be spring loaded or otherwise configured to rotate toward and away from the body of the knife in a rotational (e.g., shearing) motion. In examples in which the knife's liner may include one of the cutting shear's blades, a user may be able to cut an item or a material (e.g., fishing line) using relatively little effort and using one hand. For example, a user may be able to cut fishing line using a single finger while still gripping the knife. Accordingly, the knife with at least one integrated shearing arm described herein may reduce a quantity of tools carried by a sportsman and enable them to quickly perform multiple tasks that would otherwise require multiple tools, among other advantages.

Features of the disclosure are illustrated and described in the context of systems and architectures. Features of the disclosure are further illustrated and described in the context of isometric views, side views, and section views of a knife with a shearing arm in accordance with examples as disclosed herein.

Figure 1:
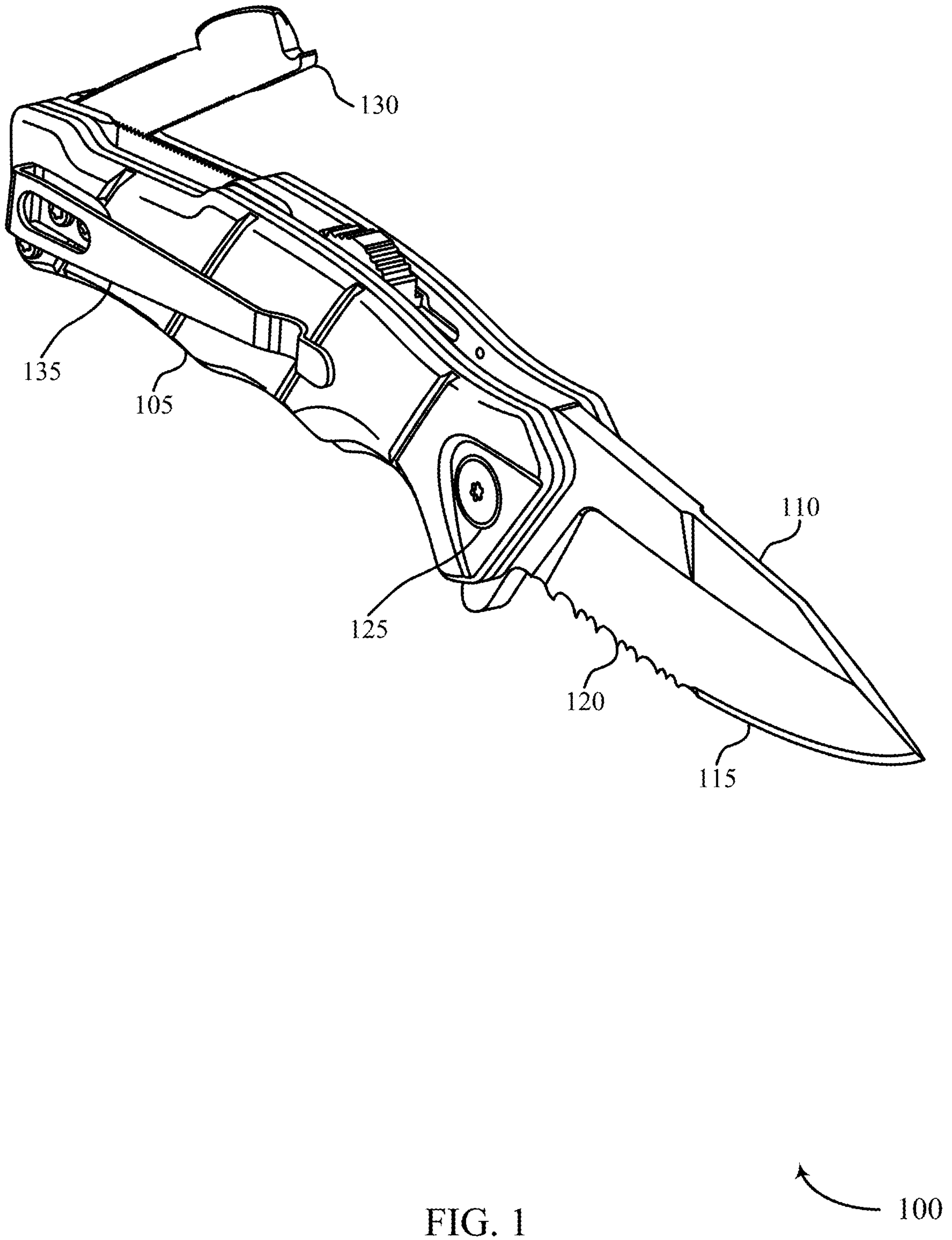
FIG. 1 shows an example of an isometric view of a knife with a shearing arm in accordance with examples as disclosed herein.

FIG. 1 shows an example of an isometric view 100 of a knife with a shearing arm in accordance with examples as disclosed herein. In some examples, the isometric view 100 may illustrate a housing 105, a blade 110, a shearing arm 130, and a clip 135 of a knife. As described herein, the shearing arm 130 may be configured to rotate toward and away from the housing 105 of the knife in a shearing motion. Because the knife's liner (not shown) includes one of the cutting shear's blades, a user may be able to cut an item or a material (e.g., fishing line) using relatively little effort. For example, a user may be able to advantageously cut fishing line (among other things) using a single finger while still gripping the knife (e.g., the housing 105 of the knife). Accordingly, the knife with a shearing arm described herein may reduce a quantity of tools carried by a sportsman while enabling them to quickly perform multiple tasks that would otherwise require multiple tools, among other advantages.

The housing 105 of the knife may be the outermost portion (e.g., material) of the knife. In some examples, the housing 105 may otherwise be referred to as the body of the knife. The housing 105 may be a same or different material as other portions of the knife. For example, the housing 105 may be constructed of steel or another similar material. In other examples, the housing 105 may be constructed of a composite material. For example, the housing 105 may be constructed of a laminated plastic, such as of garolite (G10), or another similar composite material that includes one or more layers of glass fabric and epoxy resin. In some instances, the outermost portion of the housing 105 may be colored to give the knife a particular appearance. In other examples, the outermost portion of the housing may be constructed of Micarta, carbon fiber, wood, aluminum, or another suitable material.

The knife may include at least one blade 110 (e.g., a first blade 110). In some examples, the blade 110 may rotate relative to the housing 105 such that it may be extended (e.g., extended outward, as shown) or retracted (e.g., retracted to be contained within or closer to the housing 105). The blade 110 may be constructed of steel (e.g., hardened steel) or another material. In some instances, the blade 110 may include an edge 115, one or more serrations 120 (e.g., one or more teeth), other features, or any combination. For example, at least a portion of the blade 110 may include an edge 115 that is relatively sharp and used for cutting or slicing applications. In some examples (not shown), an entire side of the blade 110 may include an edge 115 (e.g., the blade 110 may not include any serrations 120).

Additionally, or alternatively, another portion of the blade 110 may include one or more serrations 120. The serrations 120 may be used to cut relatively hard or tough materials while minimizing damage to the materials'softer interior. For example, the serrations 120 may be used to cut through an exterior of an object, such as meat or similar materials having a tougher exterior and softer interior. In some examples, an entire side of the blade 110 may include serrations 120 (e.g., the blade 110 may not include an edge 115). In instances where the blade 110 includes an edge 115 and serrations 120, the edge 115 and serrations 120 may occupy any portion of the blade 110. That is, a blade 110 may include a greater length of serrations 120 than a blade 110 or vice versa.

The blade 110 may be configured to rotate relative to the housing 105. For example, the blade 110 may be configured to rotate about one or more connections 125 such that it may be retracted within or closer to the housing 105 (not shown) or extended from the housing 105 as shown in FIG. 1. In some examples, the connection 125 may be a pin-type connection that extends through the blade 110. Accordingly, the blade 110 may move (e.g., pivot, rotate) about the pin (e.g., about a fixed point) to extend or retract. That is, the connection 125 may act as a first fulcrum about which the blade 110 may pivot. In some instances, the edge 115 and/or serrations 120 of the blade 110 may not be exposed when the blade 110 is retracted within the housing 105.

The knife may also include at least one shearing arm 130. The shearing arm 130 may be retractable such that it operate as a cutting shear for performing different types of operations, such as cutting one or more materials (e.g., fishing line). That is, the shearing arm 130 may be an example of or otherwise operate as a lever. The shearing arm 130 may include a blade (e.g., a second blade, not shown) and may be spring loaded or otherwise configured to rotate toward and away from the housing 105 of the knife in a shearing motion. Because the knife's liner may include one of the cutting shear's blades (not shown), a user may be able to cut an item or a material (e.g., fishing line) using relatively little effort. For example, a user may be able to cut fishing line using a single finger and/or with minimal effort and/or while bracing the shearing arm against another object while still gripping the housing 105.

In some instances, the knife may include a clip 135 and/or other type of attachment (e.g., a hook, a bottle opener, a corkscrew, a screwdriver, one or more serrated blades, etc.). The clip 135 may allow for the knife to be removably attached (e.g., temporarily attached) to a user's pocket, shirt, or other item such that it can be accessed relatively easily and/or quickly. Accordingly, the knife with a shearing arm described herein may reduce a quantity of tools carried by a sportsman while enabling them to quickly perform multiple tasks that would otherwise require multiple tools.

Figure 2:
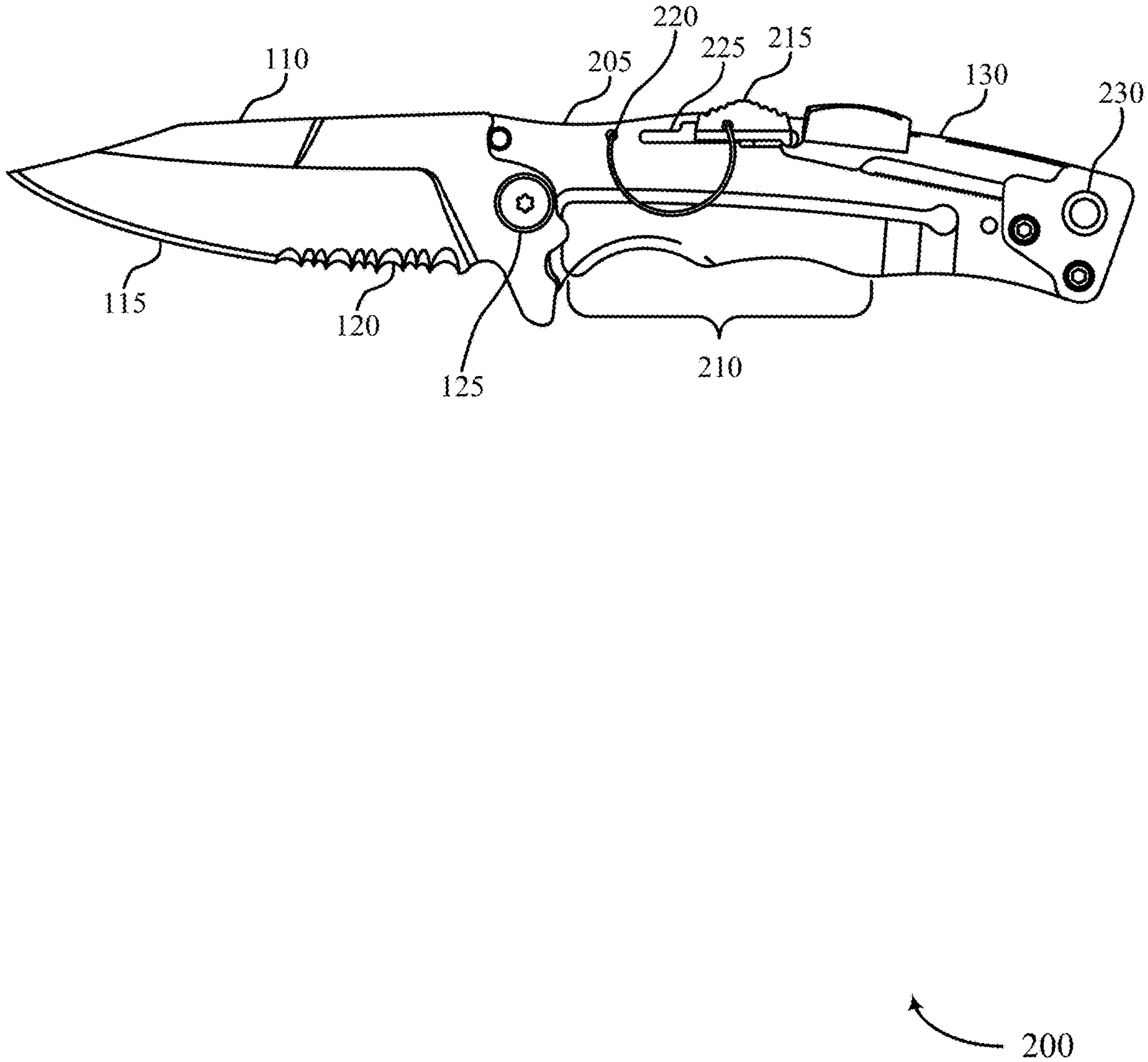
FIG. 2 shows an example of a side section view of a knife with a shearing arm in accordance with examples as disclosed herein.

FIG. 2 shows an example of a side section view 200 of a knife with a shearing arm in accordance with examples as disclosed herein. In some examples, the side section view 200 may illustrate the blade 110 (e.g., having an edge 115 and one or more serrations 120), connection 125, and shearing arm 130 as described with reference to FIG. 1. The side section view 200 may also illustrate a liner 205, a handle 210, and a lock 215 of the knife. As described herein, the liner 205 may include one or more blades (not shown) configured to brace with the shearing arm 130 to act as a shearing arm. Because the liner 205 includes one of the shearing arm's blades (not shown), a user may be able to cut an item or a material (e.g., fishing line) using relatively little effort. For example, a user may be able to cut fishing line using a single finger while still gripping the knife (e.g., the housing 105 of the knife). Accordingly, the knife with a shearing arm described herein may reduce a quantity of tools carried by a sportsman while enabling them to quickly perform multiple tasks that would otherwise require multiple tools.

The liner 205 of the knife may be located inside of the housing described with reference to FIG. 1. The liner 205 may be a same or different material as both the housing and the blade 110. For example, both the blade 110 and the liner 205 may be constructed of steel (e.g., hardened steel) or another similar material. Because the liner 205 may include a blade (not shown), it may be desirable for the liner 205 and the blade 110 to be constructed from a material being relatively hard and able to be sharpened. In some examples, the housing may be constructed of a different material than the liner 205, such as G10, and the liner may be attached to the liner 205. For example, the housing may be adhered to the liner 205 or otherwise attached using rivets or another type of fastener.

The liner 205 of the knife may include a handle 210. In some examples, the handle 210 may be constructed ergonomically such that it is relatively easy for a user to grip the knife. For example, the handle 210 may be formed such that a user's fingers may be naturally positioned around the body of the knife. In some instances (not shown), the knife's housing may be shaped and/or formed in a same or similar ergonomic pattern as the liner 205.

In some examples the knife may include a lock 215 for the shearing arm 130. For example, the lock may be positioned within a slot 225 (e.g., a groove) and may be connected to a spring 220. In some instances, the lock 215, slot 225, and spring 220 may collectively be referred to as a locking assembly or a locking mechanism for the shearing arm 130. To operate the locking mechanism, the lock 215 may be configured to move (e.g., slide) within the slot 225 and the spring 220 may apply a force on the lock 215. That is, the spring 220 may be configured to apply a force on the lock 215 to keep the lock 215 engaged with the shearing arm 130. The force may be applied on the lock 215 in a direction toward the shearing arm 130 (e.g., away from the extended blade 110).

To disengage the lock 215 (e.g., to extend the shearing arm 130), a force may be applied to slide the lock 215 (e.g., in the slot 225) toward the extended blade 110. The lock 215 may disengage from the shearing arm 130 (based on the applied force being greater than the force applied by the spring 220), resulting in the shearing arm 130 extending away from the liner 205. When the force is removed, the lock 215 may move (e.g., in the slot 225) back to its initial position due to the force applied by the spring 220. In some instances (not shown), the lock 215 and the shearing arm 130 may each include a groove, a latch, or a tooth, configured to engage with each other when in the locked position. Additionally, or alternatively, the spring 220 may be a coil (e.g., a coiled spring 220) or may be a generally curved piece of material, such as metal, configured to exert a force on the lock 215.

The shearing arm 130 may be configured to rotate relative to the liner 205. For example, the shearing arm 130 may be configured to rotate about a connection 230 such that it may be retracted to engage with the lock 215 as shown in FIG. 2, or extended from the liner 205 (as shown in FIG. 1). In some examples, the connection 230 may be a spring-loaded connection that allows the shearing arm 130 to rotate in a shearing motion (e.g., a cutting motion). Accordingly, the shearing arm 130 may move (e.g., pivot, rotate) about the connection 230 to extend or retract. That is, the connection 230 may act as a second fulcrum about which the shearing arm 130 may pivot. In some instances (not shown), the blade of the shearing arm 130 may not be exposed when the shearing arm 130 is engaged with the lock 215.

Figure 3:
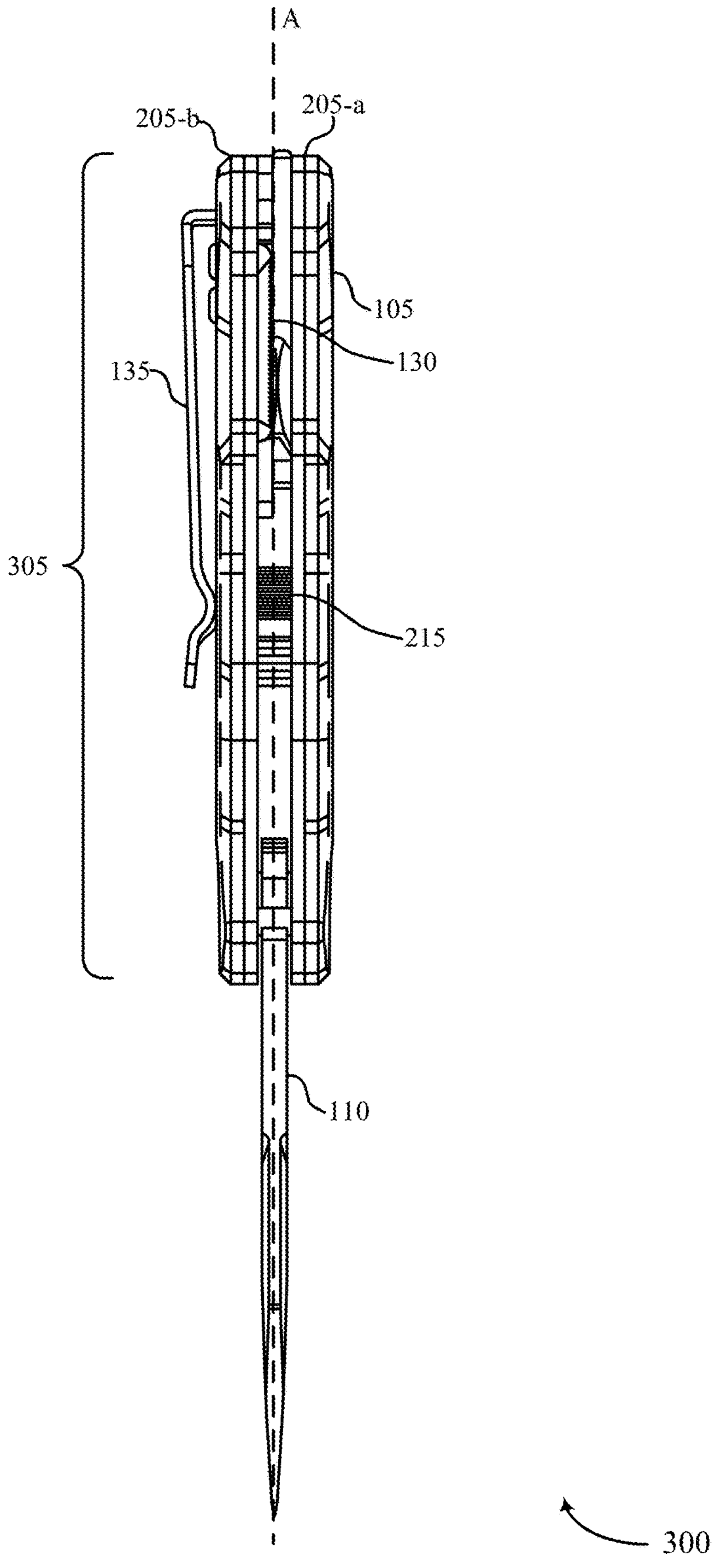
FIG. 3 shows an example of a top-down view of a knife with a shearing arm in accordance with examples as disclosed herein.

FIG. 3 shows an example of a top-down view 300 of a knife with a shearing arm in accordance with examples as disclosed herein. In some examples, the top-down view 300 may illustrate aspects of the knife previously described with reference to FIGS. 1 and 2. For example, the top-down view 300 may illustrate the housing 105, the blade 110, the shearing arm 130, the clip 135, the liner 205, and the lock 215 of the knife. As described herein, because the liner 205 includes one of the cutting shear's blades (not shown), a user may be able to cut an item or a material (e.g., fishing line) using relatively little effort. For example, a user may be able to cut fishing line using a single finger and/or with minimal effort and/or while bracing the shearing arm against another object while still gripping the housing 105 of the knife. Accordingly, the knife with a shearing arm described herein may reduce a quantity of tools carried by a sportsman while enabling them to quickly perform multiple tasks that would otherwise require multiple tools.

As shown in FIG. 3, the housing 105 may be the outermost portion of the knife. In some instances, the liner 205 may attached to the housing 105 such that it is in contact with or otherwise located inside of the housing 105. That is, the knife may include a body 305 (e.g., a handle) that includes the housing 105, the liner 205, the shearing arm 130, the clip 135, and the lock 215. In some instances, the liner 205 may include multiple portions (e.g., sides). For example, the liner 205 may include a first side 205-*a* and a second side 205-*b*. The first side 205-*a* may be opposite the second side 205-*b* about a vertical axis A. The blade 110 may be configured to rotate relative to the liner 205. In some instances, the blade 110 may be included in the body when retracted (e.g., positioned between the first side 205-*a* and the second side 205-*b*), but may located outside of the body 305 when extended. A user of the knife may grip the body 305 when using the knife.

Figure 4:
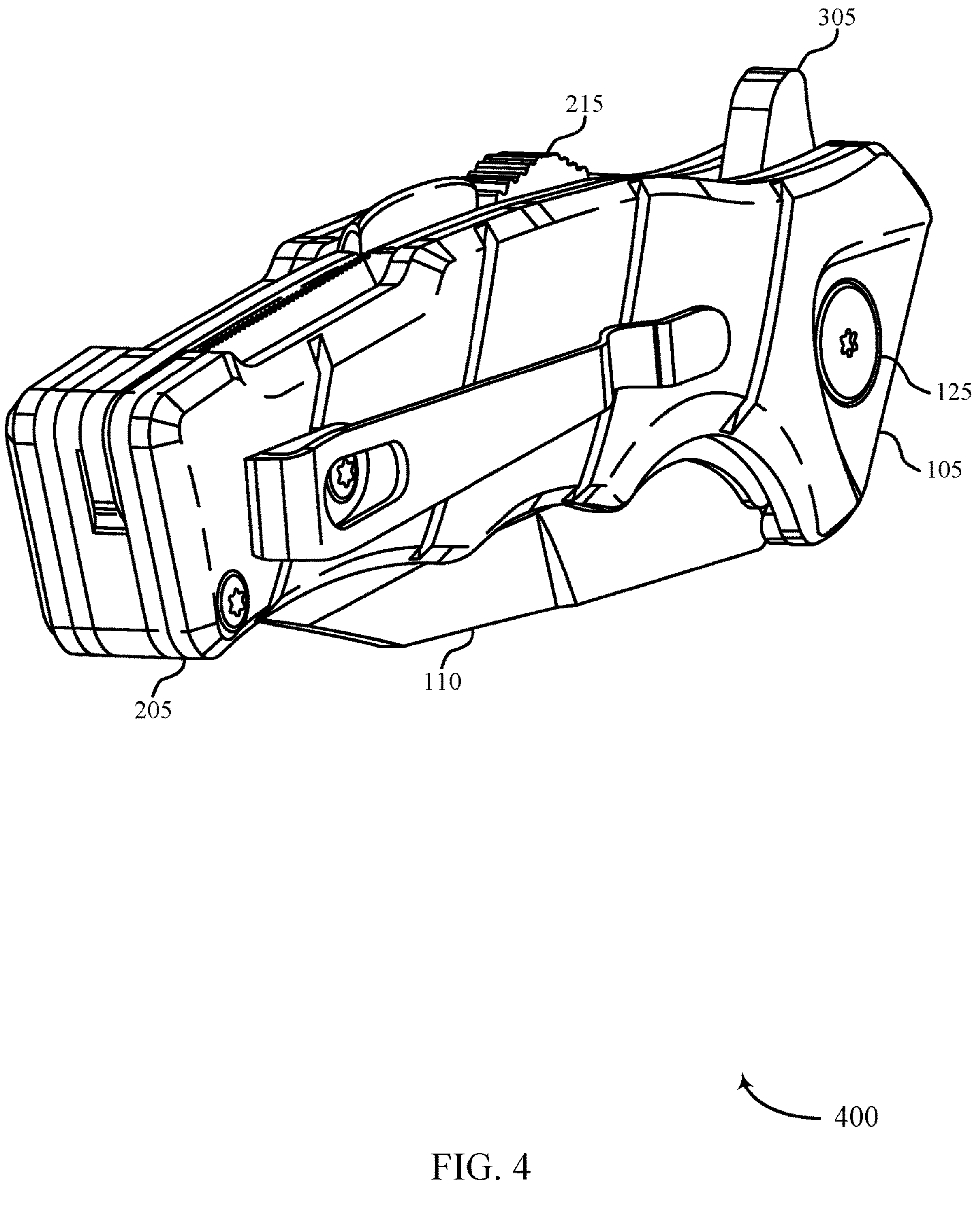
FIG. 4 shows an example of an isometric view of a knife with a shearing arm in accordance with examples as disclosed herein.

Additionally, or alternatively, the shearing arm 130 may be generally aligned with the blade 110 in a vertical direction as shown in FIG. 3. Because the shearing arm 130 may be generally centered within the body 305 (e.g., the shearing arm 130 may generally extend along axis A), it may be relatively easy for a user to operate when holding the knife. That is, the central location of the shearing arm 130 may allow for the user to grip the knife and cut items simultaneously, as opposed to having to regrip the knife due to shears that extend from the knife or that are otherwise not centrally located. Accordingly, FIG. 3 may illustrate the body 305 of the knife with a shearing arm described herein. The knife with the shearing arm may reduce a quantity of tools carried by a sportsman while enabling them to quickly perform multiple tasks that would otherwise require multiple tools FIG. 4 shows an example of an isometric view 400 of a knife with a shearing arm in accordance with examples as disclosed herein. In some examples, the isometric view 400 may illustrate aspects of the knife previously described with reference to FIG. 1-3. For example, the isometric view 400 may illustrate the housing 105, the blade 110, the liner 205, and the lock 215 of the knife. As described herein, because the liner 205 includes one of the cutting shear's blades (not shown), a user may be able to cut an item or a material (e.g., fishing line) using relatively little effort. For example, a user may be able to cut fishing line using a single finger while still gripping the knife (e.g., the housing 105 of the knife). Accordingly, the knife with a shearing arm described herein may reduce a quantity of tools carried by a sportsman while enabling them to quickly perform multiple tasks that would otherwise require multiple tools.

As shown in FIG. 4, the blade 110 may be retracted within the housing 105 and the liner 205 of the knife. In some instances, the knife may include a locking mechanism (not shown), similar to the lock 215, to hold the blade 110 in the retracted position (e.g., within the housing 105 and the liner 205). In other examples, the connection 125 may enable the blade 110 to remain the retracted position. For example, the connection 125 may include a frame lock or a liner lock, or may otherwise provide tension to maintain the blade 110 in a retracted (e.g., locked) position.

Figure 5:
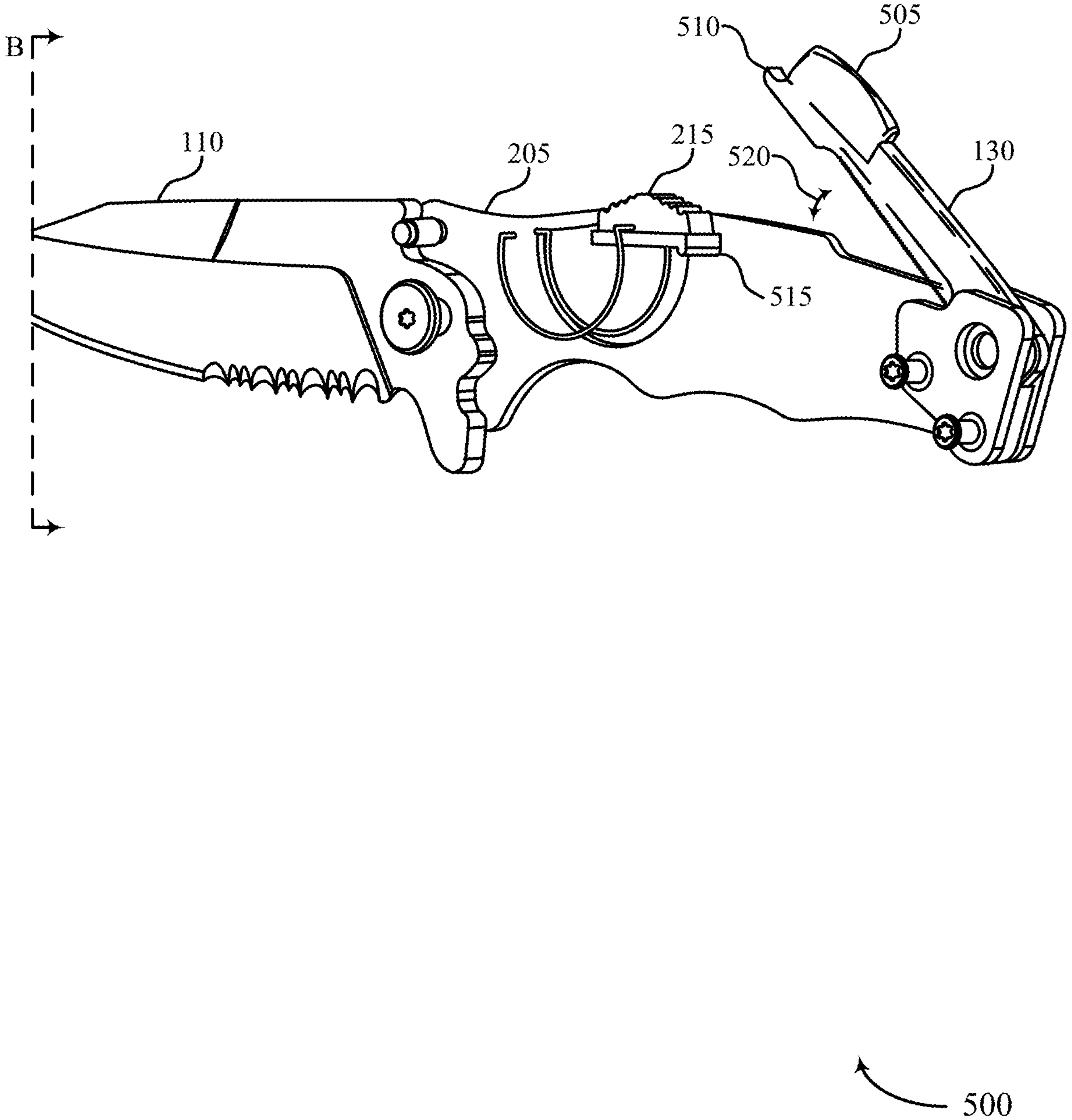
FIG. 5 shows an example of a section view of a knife with a shearing arm in accordance with examples as disclosed herein.

For example, the knife may include a liner lock or a frame lock having a spring bar (e.g., a side spring bar, not shown) located on the liner 205. When the knife is closed (e.g., when the blade 110 is retracted), the spring bar is held under tension. When fully opened (e.g., extended), that tension slips the bar inward to contact the end of the blade 110, keeping it in place and preventing it from closing. To disengage a liner lock or a frame lock, pressure may be exerted on the spring bar so that it clears contact from the blade 110, allowing the blade 110 to be folded into the liner 205. In some instances, the blade 110 may include a tab 405 that may be used to extend the blade 110 into an open position or retract the blade 110 into a closed position. For example, a user may use their thumb or finger to press on the tab 405 to open (e.g., extend) the blade 110. Accordingly, FIG. 4 may illustrate the tab 405 of the knife with a shearing arm described herein. The knife with the shearing arm may reduce a quantity of tools carried by a sportsman while enabling them to quickly perform multiple tasks that would otherwise require multiple tools FIG. 5 shows an example of a section view 500 of a knife with a shearing arm in accordance with examples as disclosed herein. In some examples, the section view 500 may illustrate aspects of the knife previously described with reference to FIG. 1-4. For example, the section view 500 may illustrate the blade 110, the shearing arm 130, the liner 205, and the lock 215 of the knife. As described herein, because the liner 205 includes one of the cutting shear's blades, a user may be able to cut an item or a material (e.g., fishing line) using relatively little effort. For example, a user may be able to cut fishing line using a single finger while still gripping the knife (e.g., the housing 105 of the knife). Accordingly, the knife with a shearing arm described herein may reduce a quantity of tools carried by a sportsman while enabling them to quickly perform multiple tasks that would otherwise require multiple tools.

The shearing arm 130 may include a tab 505 to facilitate moving the shearing arm 130 in a shearing (e.g., cutting)

motion. In some examples, the tab 505 may be curved in shape (e.g., generally curved) for ergonomic purposes. The tab 505 may curve in a direction away from a blade (not shown) of the liner 205. Additionally, or alternatively, the tab 505 may include one or more ridges or materials configured to prevent a user (e.g., a user's finger) from slipping when engaging the tab 505.

For example, the tab 505 may be shaped (e.g., sized) such that a user's finger is able to rest on it. Accordingly, the user may press the tab 505 (or rest their finger on the tab 505) when moving the shearing arm 130 to cut an item or object. In some examples, the shearing arm 130 may rotate relative to the liner 205 to cut an item or object. In other examples, when the shearing arm 130 is extended (e.g., not locked), it may extend to a fixed position. That is, when disengaged from the lock 215, the shearing arm 130 may extend to a position (e.g., the fixed position) and stop due to the connection (not shown) with the liner 205.

The shearing arm 130 may also include a tab 510 configured to engage with the lock 215. In some examples, the tab 510 may be or may otherwise be referred to as a lip, a lock, a groove, a second portion of the shearing arm 130, or another type of mechanism to engage with the lock 215. For example, the tab 510 may be shaped such that it engages with a corresponding tab 515 of the lock 215. Similarly, the tab 515 may be or may otherwise be referred to as a lip, a lock, a groove, or another type of mechanism to engage with the shearing arm 130.

Figure 6:
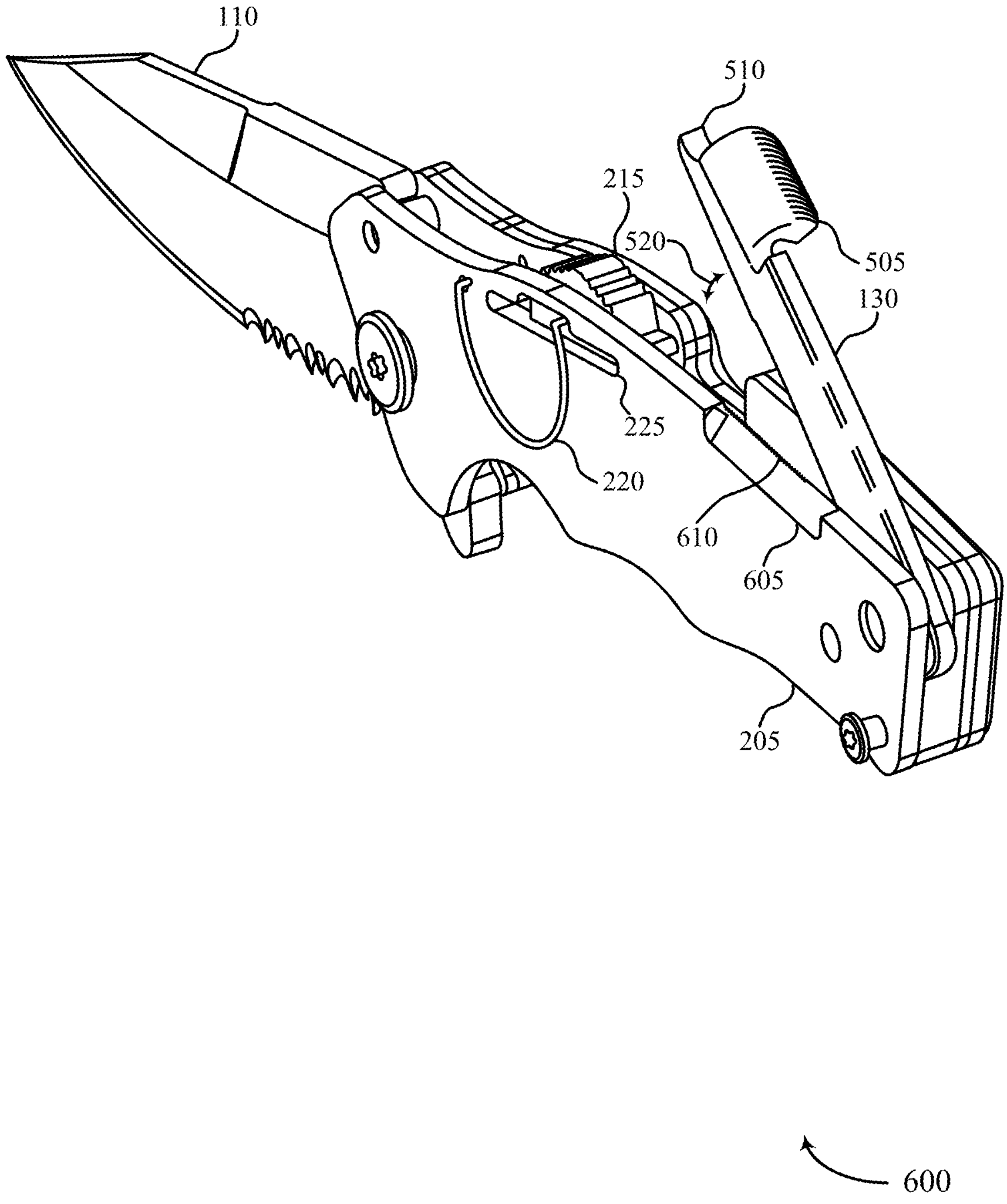
FIG. 6 shows an example of an isometric view of a knife with a shearing arm in accordance with examples as disclosed herein.

To engage with the lock 215, the shearing arm 130 may be moved (e.g., rotated) toward the liner 205 (e.g., in a second direction) such that the tab 510 is positioned on a bottom side (e.g., under) the lock 215. In some examples, the lock 215 may be manually moved (e.g., slid within the slot) to engage with the shearing arm 130. In other examples, the shearing arm 130 may exert a force on the lock 215, which may slide the lock 215 within the slot to engage with the shearing arm 130. When engaged, the tab 510 may be in contact with the tab 515, which may hold the shearing arm 130 in a retracted (e.g., a fixed) position relative to the liner 205 until the lock 215 is disengaged from the shearing arm 130. Additionally, or alternatively, when disengaged, the shearing arm 130 may extend in a first direction (e.g., away from the liner 205) to a fixed position that forms an angle 520 with (e.g., relative to) the liner. In some instances, the angle 520 may be an acute angle. In some instances, the angle 520 may be a right angle. In some instances, the angle 520 may be an obtuse angle. Accordingly, FIG. 5 may illustrate aspects of the shearing arm 130 of the knife with a shearing arm described herein. The knife with the shearing arm may reduce a quantity of tools carried by a sportsman while enabling them to quickly perform multiple tasks that would otherwise require multiple tools FIG. 6 shows an example of an isometric view 600 of a knife with a shearing arm in accordance with examples as disclosed herein. In some examples, the isometric view 600 may illustrate aspects of the knife previously described with reference to FIG. 1-5. For example, the isometric view 600 may illustrate the blade 110, the shearing arm 130, the liner 205, the lock 215, the slot 225, the spring 220, the tab 505, and the tab 510. As described herein, because the liner 205 includes one of the cutting shear's blades (not shown), a user may be able to cut an item or a material (e.g., fishing line) using relatively little effort. For example, a user may be able to cut fishing line using a single finger while still gripping the knife (e.g., the housing 105 of the knife). Accordingly, the knife with a shearing arm described herein may reduce a quantity of tools carried by a sportsman while enabling them to quickly perform multiple tasks that would otherwise require multiple tools.

In some examples, the liner 205 (and the housing, not shown) may include one or more chamfered edges 605. The chamfered edges 605 may be adjacent (e.g., next to, in contact with) to a blade 610 (e.g., a third blade 610) of the liner 205. For example, the chamfered edges 605 may be positioned adjacent to the blade 610 such that the blade 610 is exposed. That is, if the liner 205 (and the housing) did not include a chamfered edge 605, the blade 610 may not be exposed, which would otherwise make it difficult to cut an item or object with the shearing arm. In some instances, the chamfered edge 605 and the blade 610 may be located on a first side (e.g., a first side 205-*a* as described with reference to FIG. 3) of the liner 205. Additionally, or alternatively, the blade 610 may include an angle (e.g., the blade 610 may be angled) toward the chamfered edge 605.

The blade 610 may be integrated within the liner 205 of the knife. That is, the blade 610 may be a part of (e.g., made from) the liner 205 such that a portion of the shearing arm 130 contacts the blade 610 when operated in a shearing motion (e.g., in a cutting motion). For example, the blade 610 and the blade (not shown) of the shearing arm 130 may contact each other (e.g., brace with each other) when the shearing arm 130 is rotated toward the liner 205. The contact between the blade 610 and the blade (not shown) of the shearing arm 130 may allow for items or objects to be cut by the shears.

Because the blade 610 is integrated in the liner 205, the blade 610 and the liner 205 may each be a same material, such as steel (e.g., a hardened steel). Additionally, or alternatively, the blade 610 may include an edge (e.g., similar to the edge 115 as described with reference to FIG. 1). In other examples, the blade 610 may include one or more serrations or micro serrations in addition to or in place of the edge. For example, the entire blade 610 may include one or more micro serrations, none of the blade 610 may be serrated, or a portion of the blade 610 may include one or more micro serrations. The presence of the edge and/or micro serrations may allow for the shears to effectively cut an item or object, such as fishing line.

Figure 7:
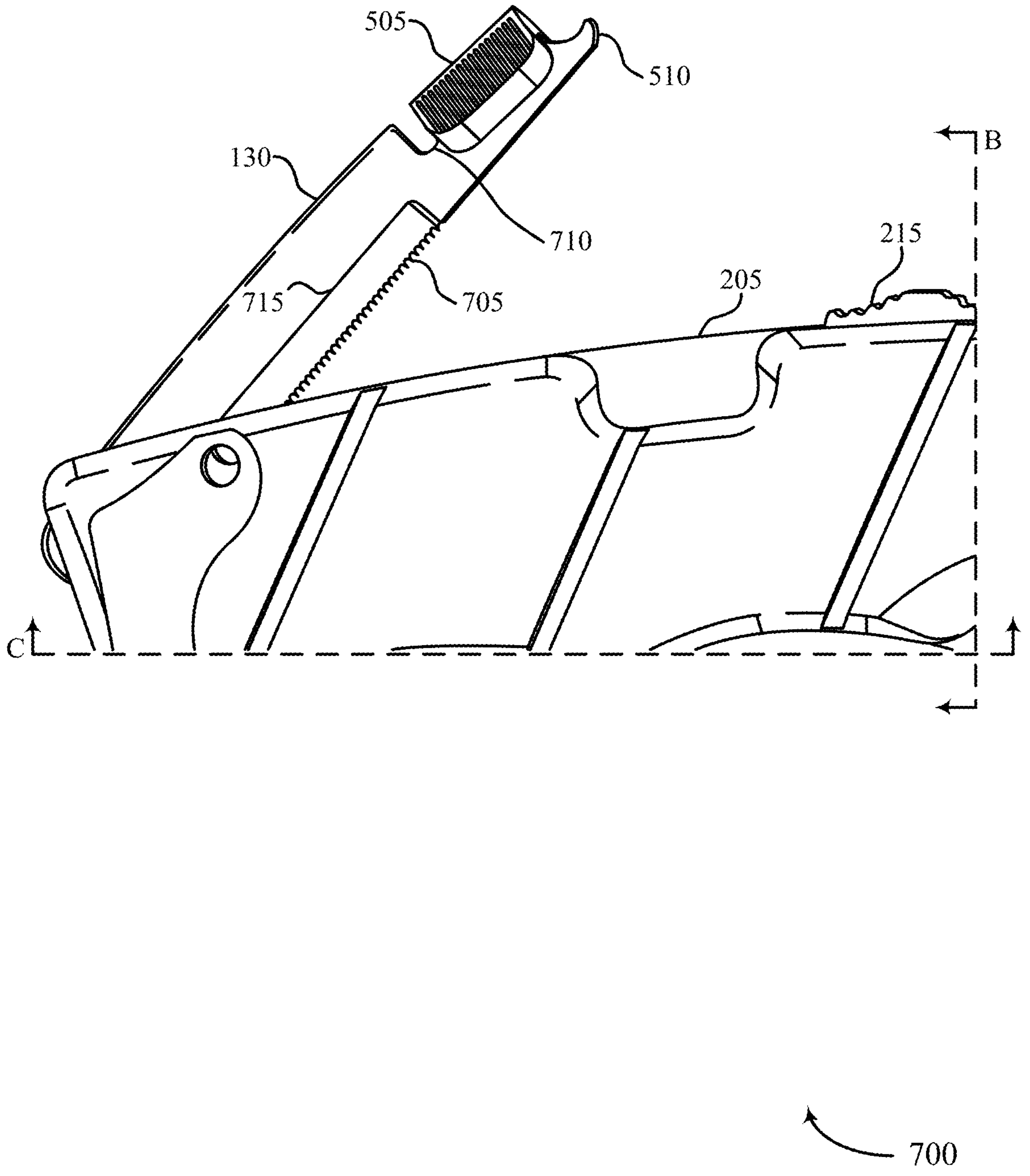
FIG. 7 shows an example of a partial side view of a knife with a shearing arm in accordance with examples as disclosed herein.

In some examples, the blade 610 may contact the blade (not shown) of the shearing arm 130 when operated in a shearing motion (e.g., in a cutting motion). For example, the blade 610 and the blade (not shown) of the shearing arm 130 may contact each other (e.g., brace with each other) when the shearing arm 130 is rotated toward the liner 205. The contact between the blade 610 and the blade (not shown) of the shearing arm 130 may allow for items or objects to be cut by the shears. Additionally, or alternatively, the blade 610 may include an angle (e.g., the blade 610 may be angled) toward the chamfered edge 605. Accordingly, FIG. 6 may illustrate the blade 610 of the knife with a shearing arm described herein. The knife with the shearing arm may reduce a quantity of tools carried by a sportsman while enabling them to quickly perform multiple tasks that would otherwise require multiple tools FIG. 7 shows an example of a partial side view 700 of a knife with a shearing arm in accordance with examples as disclosed herein. In some examples, the partial side view 700 may illustrate aspects of the knife previously described with reference to FIG. 1-6. For example, the partial side view 700 may illustrate the shearing arm 130, the liner 205, the lock 215, the tab 505, and the tab 510. As described herein, because the liner 205 includes one of the cutting shear's blades (not shown), a user may be able to cut an item (e.g., fishing line) using relatively little effort. For example, a user may be able to cut fishing line using a single finger while still gripping the knife (e.g., the housing 105 of the knife). Accordingly, the knife with the shearing arm described herein may reduce a quantity of tools carried by a sportsman while enabling them to quickly perform multiple tasks that would otherwise require multiple tools.

In some examples, a portion (e.g., a second portion) of the shearing arm 130 may include a blade 705. The shearing arm 130 may also include a chamfered edge 715, similar to the chamfered edge 605 as described with reference to FIG. 6. As described herein, the blade 705 may contact the blade (not shown) of the liner 205 when operated in a shearing motion (e.g., in a cutting motion). For example, the blade 705 and the blade (not shown) of the liner 205 may contact each other (e.g., brace with each other) when the shearing arm 130 is rotated toward the liner 205. The contact between the blade 705 and the blade (not shown) of the liner 205 may allow for items or objects to be cut by the shears. Additionally, or alternatively, the blade 705 may include an angle (e.g., the blade 705 may be angled) toward the chamfered edge 715.

In some instances, the blade 705 (and the shearing arm 130) and the liner 205 (e.g., the blade of the liner 205) may each be a same material, such as steel (e.g., a hardened steel). Additionally, or alternatively, the blade 705 may include an edge (e.g., similar to the edge 115 as described with reference to FIG. 1). In other examples, the blade 705 may include one or more serrations or micro serrations in addition to or in place of the edge. The presence of the edge and/or micro serrations may allow for the shears to effectively cut an item or object, such as fishing line.

In other examples, the shearing arm 130 may include a notch 710. In some instances, the notch 710 may be or may be referred to as a groove. The notch 710 may be adjacent to or otherwise located on a same side of the shearing arm 130 as the tab 505. In some examples, the notch 710 may be a "U" shape, or a "V" shape, and at least a portion may have an edge or otherwise be sharpened. The sharpened "U" or "V" shape may allow for an item or a material, such as fishing line, to be positioned within the notch 710 and cut. In some instances, the notch 710 may allow for some items (e.g., fishing line) to be cut relatively quickly relative to other cutting methods.

Accordingly, the knife with a shearing arm described herein may reduce a quantity of tools carried by a sportsman while enabling them to quickly perform multiple tasks that would otherwise require multiple tools. Moreover, FIG. 7 may illustrate the blade 705 of the knife with a shearing arm described herein. The knife with the shearing arm may reduce a quantity of tools carried by a sportsman while enabling them to quickly perform multiple tasks that would otherwise require multiple tools It should be noted that the aspects described herein describe possible implementations, and that the operations and the steps may be rearranged or otherwise modified and that other implementations are possible. Further, portions from two or more of the methods or apparatuses may be combined.

An apparatus is described. The following provides an overview of aspects of the apparatus as described herein:

Aspect 1: A knife, including: a housing; a liner having a first side and a second side opposite the second side, the liner positioned adjacent to the housing; a first blade positioned between the first side and the second side of the liner and configured to rotate relative to the liner; and a shearing arm coupled with the liner and configured to rotate relative to the liner to a fixed position, where a first portion of the shearing arm includes a second blade and, where the shearing arm is configured to brace with the first portion of the first side of the liner when the shearing arm is rotated toward the liner.

Aspect 2: The knife of aspect 1, further including: a lock coupled with the liner and configured to engage with a second portion of the shearing arm and lock the shearing arm in a fixed position relative to the liner when engaged.

Aspect 3: The knife of aspect 2, further including: a spring coupled with the shearing arm and the liner, where the shearing arm is configured to extend in a first direction away from the liner when the lock is disengaged with the second portion of the shearing arm.

Aspect 4: The knife of any of aspects 2 through 3, where the shearing arm includes a tab configured to rotate the shearing arm toward the liner, the tab is adjacent to the second portion.

Aspect 5: The knife of any of aspects 1 through 4, where the second blade is configured to cut a material when the shearing arm is rotated toward the liner.

Aspect 6: The knife of aspect 5, where a first portion of the liner includes a third blade having one or more micro serrations, the second blade and the third blade are configured to cut a material when the shearing arm is rotated toward the liner.

Aspect 7: The knife of any of aspects 1 through 6, where the shearing arm includes a groove opposite the first portion.

Aspect 8: The knife of any of aspects 1 through 7, where the shearing arm is configured to lock at an acute angle relative to the liner when the shearing arm is rotated away from the liner.

Aspect 9: The knife of any of aspects 1 through 8, where the first blade is configured to be rotated about a fixed point in a third direction such that a first portion of the first blade is located outside of the liner, and the first blade is configured to be rotated about the fixed point in a fourth direction such that the first portion of the first blade is located within the liner.

Aspect 10: The knife of any of aspects 1 through 9, where the second blade includes one or more micro serrations.

Aspect 11: The knife of any of aspects 1 through 10, where the liner includes a chamfered edge that is adjacent to the second blade.

Aspect 12: The knife of any of aspects 1 through 11, where the shearing arm is configured as a lever that can rotate relative to the liner.

Aspect 13: The knife of any of aspects 1 through 12, where the first blade is coupled with the liner via a first pin configured to act as a first fulcrum, and the shearing arm is coupled with the liner via a second pin configured to act as a second fulcrum.

Aspect 14: The knife of any of aspects 1 through 13, where the liner, the first blade, and the second blade each include steel.

An apparatus is described. The following provides an overview of aspects of the apparatus as described herein:

Aspect 15: A knife, including: a liner having a first side and a second side opposite the second side, the first side of the liner including a first blade having one or more micro serrations, where at least a portion of the first side and a portion of the second side each include a chamfered edge; a second blade positioned between the first side and the second side of the liner and configured to rotate relative to the liner; a shearing arm including a tab, the shearing arm coupled with the liner and configured to rotate relative to the liner to a fixed position, where a first portion of the shearing arm includes a third blade having one or more micro serrations and, where the third blade is configured to brace with the first blade when the shearing arm is rotated toward the liner; and a lock in contact with the liner and configured to lock the shearing arm between the first side and the second side of the liner when the shearing arm is rotated toward the liner.

Aspect 16: The knife of aspect 15, further including: a torsion spring coupled with the shearing arm and the liner, where the torsion spring is configured to rotate the shearing arm away from the liner when the lock is disengaged.

Aspect 17: The knife of any of aspects 15 through 16, further including: a housing in contact with the liner, where the housing includes a first material and the liner includes a second material different than the first material.

Aspect 18: The knife of any of aspects 15 through 17, where the liner and the third blade each include a same material.

Aspect 19: The knife of any of aspects 15 through 18, where the first blade and the third blade are configured as cutters when the first blade braces with the third blade.

Aspect 20: The knife of any of aspects 15 through 19, where the shearing arm acts as a lever when the tab is rotated toward the liner.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The description set forth herein, in connection with the appended drawings, describes example configurations and does not represent all the examples that may be implemented or that are within the scope of the claims. The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Similar components may be distinguished by following the reference label by one or more dashes and additional labeling that distinguishes among the similar components. If just the first reference label is used in the specification, the description is applicable to any one of the similar components having the same first reference label irrespective of the additional reference labels.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The descriptions and drawings are provided to enable a person having ordinary skill in the art to make or use the disclosure. Various modifications to the disclosure will be apparent to the person having ordinary skill in the art, and the techniques disclosed herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A knife, comprising:

a housing;

a liner having a first side and a second side opposite the first side, the liner positioned adjacent to the housing;

a first blade positioned between the first side and the second side of the liner and configured to rotate relative to the liner;

a shearing arm coupled with the liner and configured to rotate relative to the liner to a fixed position, wherein a first portion of the shearing arm comprises a second blade and, wherein the shearing arm is configured to brace with a first portion of the first side of the liner when the shearing arm is rotated toward the liner;

a lock coupled with the liner and configured to engage with a second portion of the shearing arm and lock the shearing arm in a fixed position relative to the liner when engaged; and a spring coupled with the lock and the liner, wherein the shearing arm is configured to extend in a first direction away from the liner when the lock is disengaged with the second portion of the shearing arm.

2. The knife of claim 1, wherein:

the shearing arm comprises a tab configured to rotate the shearing arm toward the liner; and the tab is adjacent to the second portion.

3. The knife of claim 1, wherein the second blade is configured to cut a material when the shearing arm is rotated toward the liner.

4. The knife of claim 3, wherein:

a first portion of the liner comprises a third blade having one or more micro serrations; and the second blade and the third blade are configured to cut a material when the shearing arm is rotated toward the liner.

5. The knife of claim 1, wherein the shearing arm comprises a groove opposite the first portion of the shearing arm.

6. The knife of claim 1, wherein the shearing arm is configured to be fixed at an acute angle relative to the liner when the shearing arm is rotated away from the liner.

7. The knife of claim 1, wherein:

the first blade is configured to be rotated about a fixed point in a first direction such that a first portion of the first blade is located outside of the liner; and the first blade is configured to be rotated about the fixed point in a second direction such that the first portion of the first blade is located within the liner.

8. The knife of claim 1, wherein the second blade comprises one or more micro serrations.

9. The knife of claim 1, wherein the liner comprises a chamfered edge that is adjacent to a blade of the liner.

10. The knife of claim 1, wherein the shearing arm is configured as a lever that can rotate relative to the liner.

11. The knife of claim 1, wherein:

the first blade is coupled with the liner via a first pin configured to act as a first fulcrum; and the shearing arm is coupled with the liner via a second pin configured to act as a second fulcrum.

12. The knife of claim 1, wherein the liner, the first blade, and the second blade each comprise steel.

13. A knife, comprising:

a liner having a first side and a second side opposite the first side, the first side of the liner comprising a first blade having one or more micro serrations, wherein at least a portion of the first side and a portion of the second side each comprise a chamfered edge;

a second blade positioned between the first side and the second side of the liner and configured to rotate relative to the liner;

a shearing arm comprising a tab, the shearing arm coupled with the liner and configured to rotate relative to the liner to a fixed position, wherein a first portion of the shearing arm comprises a third blade having one or more micro serrations and, wherein the third blade is configured to brace with the first blade when the shearing arm is rotated toward the liner; and a lock in contact with the liner and configured to lock the shearing arm between the first side and the second side of the liner when the shearing arm is rotated toward the liner.

14. The knife of claim 13, further comprising:

a spring coupled with the shearing arm and the liner, wherein the spring is configured to rotate the shearing arm away from the liner when the lock is disengaged.

15. The knife of claim 13, further comprising:

a housing in contact with the liner, wherein the housing comprises a first material and the liner comprises a second material different than the first material.

16. The knife of claim 13, wherein the liner and the third blade each comprise a same material.

17. The knife of claim 13, wherein the first blade and the third blade are configured as cutters when the first blade braces with the third blade.

18. The knife of claim 13, wherein the shearing arm acts as a lever when the tab is rotated toward the liner.

* * * * *